United States Patent [19]

Lloyd

[11] 3,977,545
[45] Aug. 31, 1976

[54] SNOWMOBILE LOADING APPARATUS
[76] Inventor: John B. Lloyd, 12960 E. 55th Ave., Denver, Colo. 80239
[22] Filed: Jan. 29, 1975
[21] Appl. No.: 545,118

[52] U.S. Cl. .................................. 214/85; 296/61
[51] Int. Cl.² ........................................ B65G 67/02
[58] Field of Search ................ 214/85, 85.1; 14/71, 14/72; 296/61

[56] References Cited
UNITED STATES PATENTS

| | | | |
|---|---|---|---|
| 2,370,427 | 2/1945 | Sherry | 214/85 |
| 3,511,393 | 5/1970 | Abromavage et al. | 214/85 |
| 3,613,920 | 10/1971 | Flamm | 214/85 |
| 3,756,440 | 9/1973 | Raap et al. | 214/85 |
| 3,757,972 | 9/1973 | Martin | 214/85 |
| 3,870,170 | 3/1975 | Noble et al. | 214/85 |

Primary Examiner—Albert J. Makay
Attorney, Agent, or Firm—Reilly and Hancock

[57] ABSTRACT

A loading apparatus for pickup trucks and the like is characterized by elongated interchangeable ramp sections releasably secured to the rear end of a special platform on the bed of the pickup truck so that the ramp sections are releasably attachable for downward extension from the platform to the ground, and further are slidable into a storage position beneath the platform when not in use. Alternate types of platforms have been devised to vary the effective width of the pickup truck bed to accommodate one or more vehicles, and the ramp sections include different types of tread surfaces which are interchangeable to facilitate loading and unloading of different types of vehicles.

22 Claims, 11 Drawing Figures

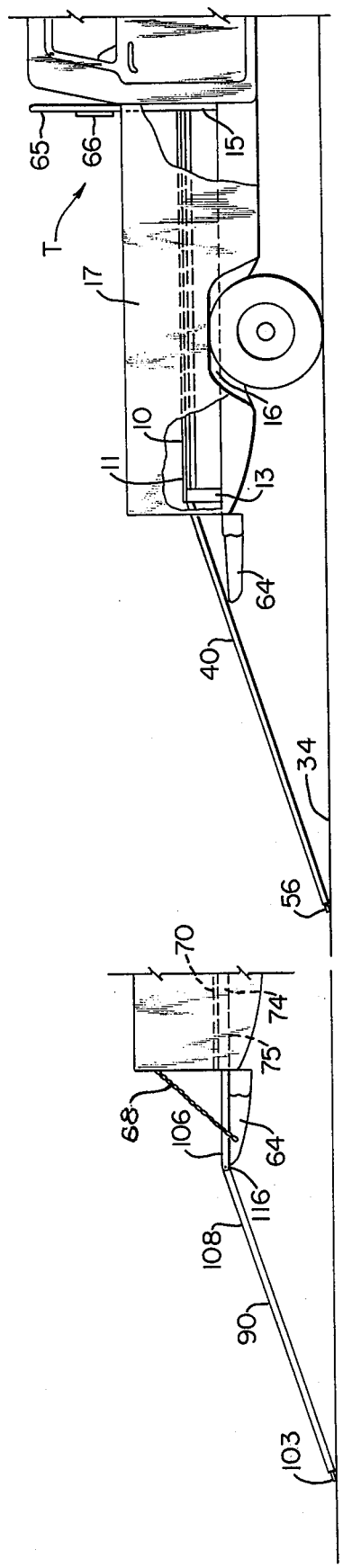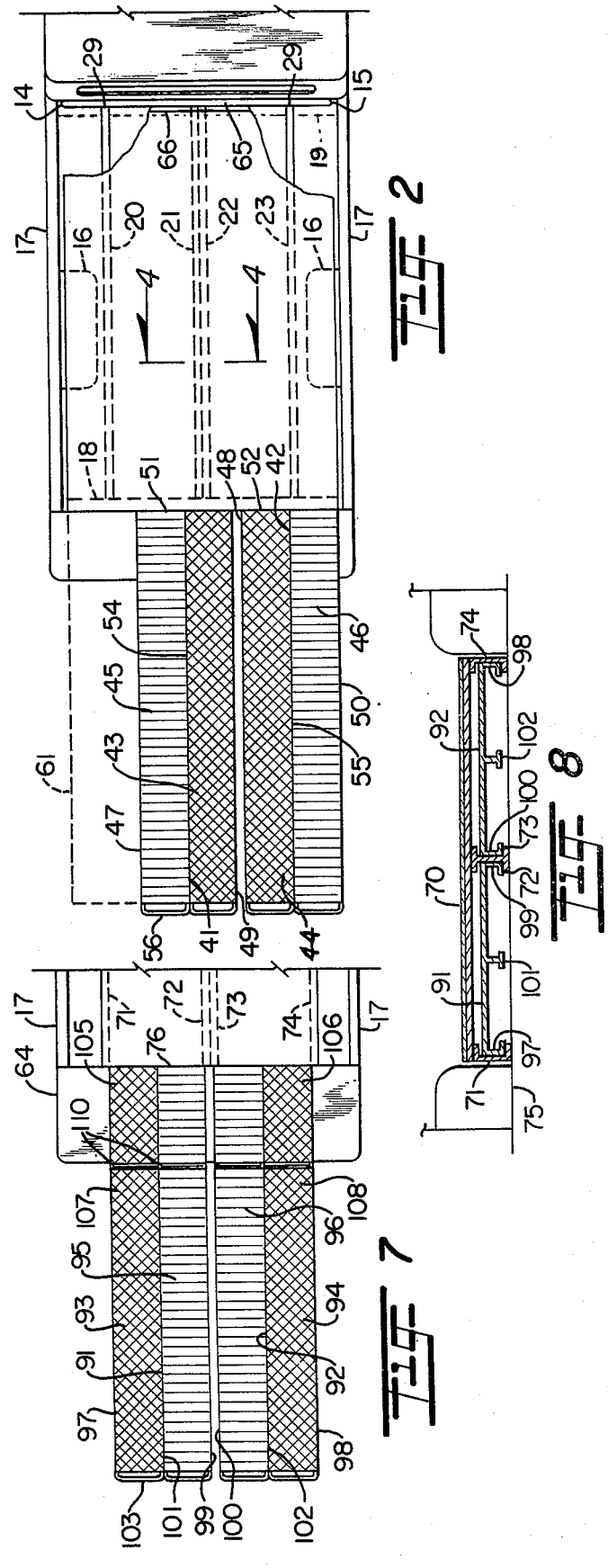

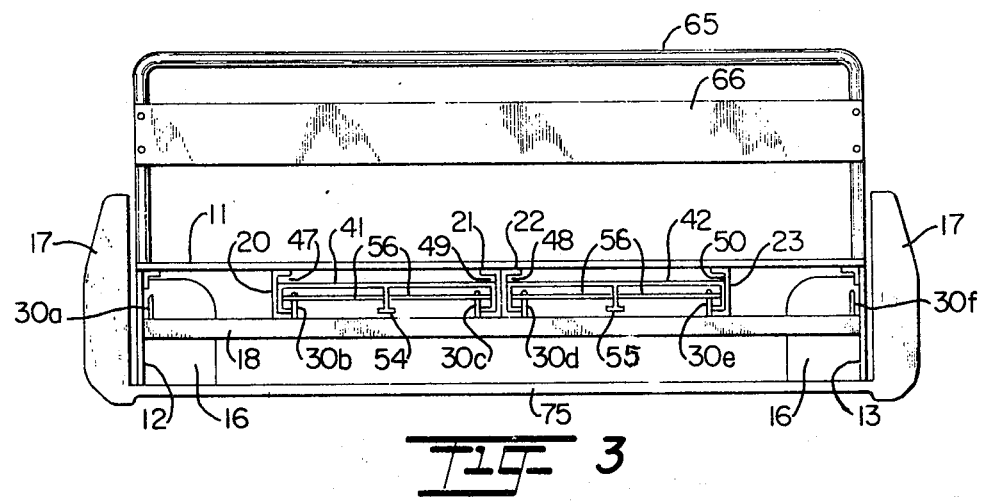
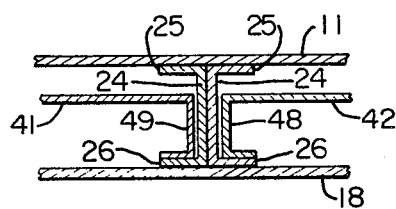
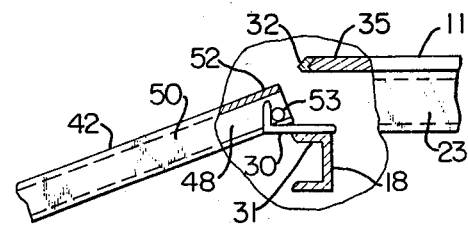
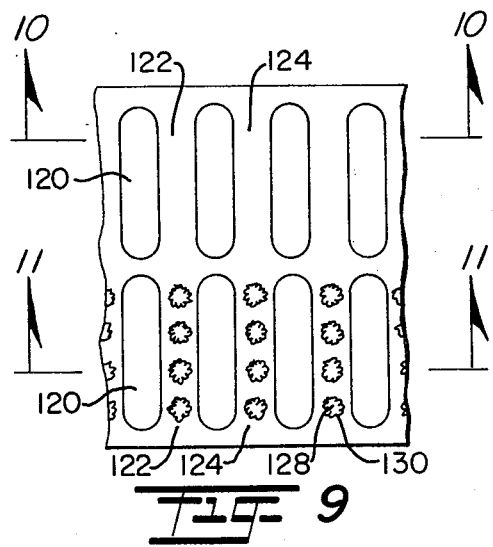
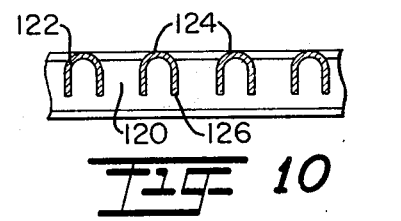
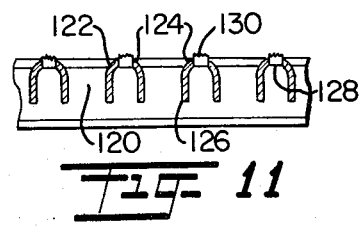

SNOWMOBILE LOADING APPARATUS

This invention relates to novel and improved loading ramps for use in loading and transporting small vehicles such as snowmobiles, garden tractors and the like in pickup trucks or small trailers. More particularly, the present invention pertains to a novel and improved ramp assembly for pickup trucks and the like characterized by its versatility, ease of loading and manipulation.

BACKGROUND OF THE INVENTION

Pickup trucks and small trailers have become common means of transporting relatively small recreational vehicles such as snowmobiles, motorcycles, dune buggies, garden tractors and the like. Even though such vehicles are relatively small, most are heavy and bulky rendering them difficult to manually lift into a pickup truck. Further, vehicles such as snowmobiles are too wide for two of them to fit side-by-side between the wheel wells boxed out of the beds of ordinary pickup boxes, although they will fit side-by-side within the width of the box itself above the wheel wells.

Various means have been devised to alleviate some of the problems with loading and transporting small vehicles; however, some of the simpler devices fall short of satisfactorily alleviating both the problems of manual lifting and providing sufficient surface area for transporting two snowmobiles side-by-side in the pickup box. Other devices have attempted to alleviate both of these problems, but they have become unduly complicated, burdensome and expensive to manufacture. Further, none of the means already devised have attempted to alleviate the additional problems of providing loading ramps suitable for accommodating snowmobile skis as well as nonskid traction surfaces for drive tracks of snowmobiles and drive wheels of other vehicles, especially under conditions in which the vehicles being loaded tend to carry snow, mud, and other foreign material onto the loading ramps.

Having taken the aforesaid problems into consideration, I have devised a more versatile, simple and easily manufactured transport platform and loading ramp structure which provides sufficient platform surface area to transport two snowmobiles side-by-side in a pickup truck including a novel and improved loading ramp assembly for accommodating various types of vehicles with interchangeable surfaces to facilitate loading and unloading vehicles of different types onto and from an elevated platform.

SUMMARY OF THE INVENTION

It is an object of the present invention to provide a novel and improved loading ramp assembly adaptable for use in loading and unloading various articles to and from an elevated position.

It is also an object of this invention to provide a loading ramp to facilitate loading snowmobiles and other motorized vehicles onto an elevated platform under their own power with no manual lifting or pushing.

It is a further object of this invention to provide a loading ramp comprising a set of reversible sections and interchangeable rough and smooth surfaces to facilitate loading of different types of vehicles.

It is a still further object of this invention to provide a loading ramp which is readily slidable between a convenient storage position in the box of a pickup truck and the like and an extended use position.

In addition, an object of this invention is to provide a platform for transporting snowmobiles and other small vehicles in the box of a pickup truck and the like.

Another object of this invention is to provide a transport platform in an elevated position above the bed and wheel wells of a pickup box and the like for maximum utilization of the width of the pickup box in transporting snowmobiles and other small vehicles while providing a convenient storage area for loading ramps beneath the platform.

It is still another object of the present invention to provide a transport platform and loading ramp combination which is lightweight, easy and inexpensive to manufacture with a minimum number of parts, which is convenient to use and occupies a minimum of space.

The present invention is directed to a novel method and means for loading snowmobiles, motorcycles, garden tractors, and other small motorized vehicles onto an elevated transport platform in a pickup truck box or the like. In a preferred form, the transport platform is elevated above the wheel wells in the bed of the pickup truck box for maximum utilization of the width of the box, especially for transporting two snowmobiles in side-by-side relation to one another, since there is not enough space between the wheel wells in standard wide model pickup truck boxes to accommodate two snowmobiles. A loading ramp assembly is provided which is readily slidable between a storage position under the elevated platform to an extended use position in which the ramp extends at an incline from the elevated transport platform over the tail gate of the pickup truck to the ground. Means are also provided for securing the loading ramp to the transport platform in alternate positions so that snowmobiles or other vehicles can be driven under their own power from the ground, over the ramp, and onto the left side, the right side, or the middle portion of the transport platform depending on how the user desires the load to be distributed on the transport platform. In an alternate form, a more compact platform is disposed in a lower position with hinged ramp sections adapted to extend horizontally along the floor of the truck and to incline downwardly from the tail gate to the ground.

A particular feature of the loading ramp assembly in either form is embodied in the interchangeable smooth surfaces and nonskid rough traction surfaces in a plurality of ramp sections to accommodate different types of vehicles. When used in one configuration, the ramps are so dimensioned and arranged that the skis of a snowmobile can slide over spaced smooth surfaces on the outside loading ramp sections while the drive track engages the nonskid rough surfaces on the middle ramp sections thereby minimizing risk of undue wear or damage to the skis while providing sufficient traction to safely propel the snowmobiles up the inclined ramp and onto the transport platform. In loading garden tractors and the like the nonskid, rough ramp sections are placed on the outsides to provide traction for the drive wheels of the tractor. Open spaces and holes in the ramp surfaces allow snow, mud and other foreign material to be displaced through the ramp sections by the drive track or drive wheels of the vehicle being loaded so that maximum traction and safety is insured during loading operations.

BRIEF DESCRIPTION OF THE DRAWINGS

Other objects, advantages and features of the present invention will become more apparent as the description proceeds, taken in conjunction with the accompanying drawings, in which:

FIG. 1 is a side elevation view of a pickup truck equipped with the preferred form of the loading ramp and platform showing the loading ramp in extended position for loading use, parts of the side body of the pickup truck being broken away to reveal the details of the construction.

FIG. 2 is a plan view showing a pickup truck and the preferred form of the loading ramp and platform with loading ramp in extended position for loading the right side of the platform, the alternate position for loading the left side of the platform being shown in phantom lines. The front corners are cut away to reveal the support structure of the platform.

FIG. 3 is an enlarged rear elevation view showing a pickup box with the tailgate and bumper broken away to reveal the preferred form of the platform with the loading ramps in storage position.

FIG. 4 is an enlarged transverse vertical section view taken substantially in the plane indicated by the section line 4—4 of FIG. 2, but with the ramps being shown in storage position.

FIG. 5 is a fragmentary, side elevation view partially in section to show the engagement of the forward end of the ramp with the rear end of the platform in the preferred form.

FIG. 6 is a side elevation view of the rear end of a pickup truck equipped with an alternate form of loading ramp and platform in accordance with this invention, the loading ramp being shown in the extended position.

FIG. 7 is a plan view showing the rear end of a pickup truck and the alternate form of the loading ramp in extended position for loading, the ramp sections being shown with the rough and the smooth portions in reversed position for loading of different types of vehicles.

FIG. 8 is a transverse vertical section view taken on a plane through the bed of a pickup truck and with the ramps being shown in storage position.

FIG. 9 is an enlarged plan view of a typical portion of one section of a loading ramp.

FIG. 10 is a transverse vertical section view taken substantially on the plane indicated by the section line 10—10 of FIG. 9; and FIG. 11 is a transverse vertical section view taken substantially on the plane indicated by the section line 11—11 of FIG. 9.

DESCRIPTION OF THE PREFERRED EMBODIMENT

Referring now to the drawings, FIG. 1 shows the preferred general structure of a transport platform which is generally designated 10 and a loading ramp assembly which is generally designated 40.

The transport platform 10 is constructed with a top surface 11 which may be made from sheet steel, wood, or other suitable material with a protective metal nosing 32 across the end 35 of top surface 11 (see FIG. 5). The top surface 11 is supported by an understructure or ramp section housing comprising two vertical legs 12 and 13 at each of the rear corners and two vertical legs 14 and 15 at each of the front corners. The legs 12, 13, 14 and 15 rest on the bed 75 of pickup box 17 and are of sufficient length to support the top surface 11 of the platform 10 in a raised position above the wheel wells 16 in a conventional pickup box 17 of a truck T.

Referring now to FIGS. 1 to 4, a steel beam cross brace member 18 is attached between the two rear legs 12 and 13, and a similar cross brace member 19 is attached between the two front legs 14 and 15. The cross members 18 and 19 support two pairs of glideways 20–21 and 22–23 for extension along the length of the undersurface of the platform 10 and between the wheel wells 16. Each glideway 20, 21, 22 and 23 is correspondingly formed of a U-shaped channel section 24 with an upper flange 25 and a lower flange 26, each pair of glideways arranged to open horizontally in opposed facing relation to one another with the inner glideways 21, 22 disposed in back-to-back relation.

A pipe rack guard 65 with bumper board 66 is mounted at the front and above platform 10 to prevent the vehicles loaded onto the platform from moving forwardly into the body of the pickup and causing damage to the truck T.

Referring now to FIGS. 3 and 5, the cross brace 18 also contains six spaced hooks 30 rigidly attached to the top flange 31 of cross brace 18 and which protrude rearwardly and upwardly from the cross member 18. The hooks are defined by right angle rods having upwardly projecting ends 30a–f which coact with the ramps 40, as will be described later, both to support the ramps in the extended loading position and to retain the ramps beneath the platform when in the storage position.

Referring to FIGS. 1 and 2, the loading ramp assembly 40 consists of two elongated ramp sections 41 and 42. Section 41 is preferably defined by a pressed steel member of oblong shape formed into two half-sections including a rough surface 43 on the right half and a smooth surface 45 on the left half. Section 42 is similarly constructed but with the rough surface 44 on the left half and the smooth surface 46 on the right half. The functions of the rough and smooth surfaces will be described later. Each ramp section has a generally rectangular frame in which opposite sides 47 and 49 of the ramp section 41 and opposite sides 48 and 50 of ramp section 42 are in the form of inwardly facing channels, as shown in FIGS. 2, 3 and 4. Each section 41 and 42 also contains a double channel-shaped member 55 at the midspan of each section and extending the entire length of each section as shown in FIGS. 2 and 3. Handles 56 are attached to the rear ends of channels 47, 54 and 49 of section 41 and to the rear ends of channels 48, 54 and 50 of section 42. A shaft 53 is rigidly attached at each end between side channels 47 and 49 under the front edge 51 of ramp section 41, and a similar shaft 53 is rigidly attached at each end between side channels 48 and 50 under the front edge 52 of the ramp section 42.

When the loading ramp sections 41 and 42 are fully extended from the rear end of the platform 10 to the ground 34 in the inclined loading position, the front edges 51 and 52 are supported by the shafts 53 which rest on the hooks 30 to prevent the ramp sections 41 and 42 from shifting or falling to the ground during loading operations. The vertical ends of hooks 30 are positioned slightly rearward of the rear edge 35 of the platform 10 to allow space for the front edges 51 and 52 and the shafts 53 to be lifted and removed from the rear end of the platform 10.

The glideways 20 to 23 provide a convenient storage space for the loading ramps 40 when they are not being used for loading operations. The left set of glideways 20 and 21 are spaced to receive the channel-shaped sides 47 and 49 of the ramp section 41, and the right set of glideways 22 and 23 are spaced to receive the channel-shaped sides 48 and 50 of ramp section 42. The spacing between the left glideways 20 and 21 is also the same as the spacing between the right glideways 22 and 23 so that ramp section 41 can alternately be stored in right glideways 22 and 23 and ramp section 42 can alternately be stored in left glideways 20 and 21. FIGS. 3 and 4 show the loading ramp sections 41 and 42 in storage position with side channel 47 of section 41 inserted into the U-shaped section 24 of glideway 20, and the side channel 49 of section 41 inserted into the U-shaped section 24 of glideway 21. The side channels 48 and 58 are similarly inserted into the U-shaped sections 24 of glideways 22 and 23, respectively.

In order to slide the ramps 40 into the storage position, the front edge 51 and shaft 53 of ramp section 41 are placed over the hooks 30b and 30c. The ramp section 41 is then manually lifted into a horizontal position by holding handles 56 and is then pushed forward into glideways 20 and 21 until the full length of the ramp section 41 is under the platform 10. When the ramp section 41 is pushed all the way forward, the hooks 30b and 30c will contact the handles 56 thus preventing the ramp section 41 from sliding too far forward into the body of the pickup truck T. Ramp section 42 is similarly placed in storage position by placing its front edge 52 and shaft 53 over hooks 30d and 30e, lifting into horizontal position by handles 56, and pushing forward into glideways 22 and 23 until hooks 30d and 30e contact the handles 56. When the ramp 40 is in storage position, the pickup tailgate 64 can be closed in its normal position.

One of the features of the preferred form of the invention is that two snowmobiles or similar vehicles can be transported in side-by-side relation on the platform 10 at one time. FIG. 2 shows the loading ramp 40 in position for loading the right side of platform 10. In this position, the front edge 51 and shaft 53 of ramp section 41 are placed over hooks 30c and 30d, and front edge 52 and shaft 53 of ramp section 42 are placed over hooks 30e and 30f. FIG. 2 also indicates by phantom lines 61 the position of loading ramp 40 for loading the left side of platform 10. In this position, the front edge 51 and shaft 53 of ramp section 42 are placed over hooks 30c and 30d. In addition, the center of platform 10 can be loaded with only one vehicle by placing the front edge 51 and shaft 53 of ramp section 41 over hooks 30b and 30c and by placing front edge 52 and shaft 53 of ramp section 42 over hooks 30d and 30e. It will be readily apparent that the ramp sections may be interchanged or switched to place either the rough or smooth surfaces to the outside as desired in loading and unloading different types of vehicles.

This invention also embodies a simpler, alternate structure for transporting smaller loads, e.g., a single snowmobile. Referring to FIGS. 6, 7 and 8, this alternate structure is lower in profile with a narrower platform surface 70, so as to fit between the wheel wells 16 in a standard wide model pickup box 17; or for fitting in standard narrow model pickup boxes which do not contain boxed-out wheel wells. The platform 70 of this alternate structure, although narrower than the wider structure 10 described above, is constructed substantially the same. Referring to FIG. 8, the platform 70 is supported by pairs of channel-shaped glideways 71–72 and 73–74 which extend the entire length of the platform 70 and rest directly on the bed 75 of the pickup box 17.

The loading ramp 90 of the alternate structure is similar in construction to the loading ramp 40 of the preferred structure in that it also consists of two sections 91 and 92 with alternate rough surfaces 93 and 94 and smooth surfaces 95 and 96. The ramp sections 91 and 92 also contain similar channel-shaped sides 97–99 and 98–100, respectively, and double channel-shaped reinforcing members 101 and 102 respectively at the midspan of ramp sections 91 and 92. As in the preferred structure handles 103 are provided on ramp sections 91 and 92, respectively.

In the alternate structure which is lower in profile, the loading ramp 90 cannot extend straight from the rear end of platform 70 to the ground 34 due to interference from the tailgate 64. It is necessary, therefore, to modify the structure of the loading ramps 90. Referring to FIGS. 6 and 7, each ramp section 91 and 92 is separated into front subsections 105 and 106 which are hinged to rear subsections 107 and 108, respectively, by hinges 110.

In the loading position, the pickup tailgate 64 is lowered to a horizontal position and held in that position by tailgate chains 68 or other conventional means provided by the pickup manufacturer. The front subsections 105, 106 of ramp sections 91, 92 which are slightly longer than the tailgate 64 rest horizontally on the tailgate 64 as shown in FIG. 6. The rear subsections 107, 108 of ramp sections 91, 92 then extend from the hinges 110 at an angle to the ground. The front of each ramp subsection 105, 106 is secured to the rear of the platform 70 in a similar manner to that described for the preferred structure and as shown in FIG. 5.

When loading operations are complete, the rear ends of the rear subsections 107, 108 are raised to the horizontal position by manually lifting handles 103 and pushing the ramp sections 91, 92 into their respective glideways 71, 72 and 73, 74. As shown in FIG. 8, the channel sides 97, 99 and 98, 100 of ramp sections 91, 92 are received into the slightly larger channel-shaped glideways 71, 72 and 74, 73, respectively, similar to the storage position described with reference to the preferred structure.

As described above, the ramp sections 41, 42 of the preferred embodiment are divided into rough surfaces 43, 44 and smooth surfaces 45, 46. As illustrated in FIG. 2 for the preferred embodiment, the smooth surfaces 45, 46 are positioned on the outsides of the ramp 40 to accommodate the skis of a snowmobile thereby minimizing the risk of damage or excessive wear to the skis, and the rough surfaces 43, 44 are positioned on the middle of the ramp 40 to provide a traction surface for the drive track of a snowmobile thereby aiding in driving the snowmobile up the ramp 40 and onto the platform 10 without slippage. Alternately, the positions of the ramp sections 41, 42 can be interchanged to place the rough surfaces 43, 44 to the outsides of the ramp 40 and the smooth surfaces 45, 46 to the middle of ramp 40 so that the spaced rough traction surfaces 43, 44 are aligned with the drive wheels of a garden tractor or other vehicle being loaded. This interchangeable rough and smooth surfaces feature is also provided in the alternate embodiment. As illustrated in FIG. 7, the ramp sections 91 and 92 are so arranged with the rough surfaces 93 and 94 in spaced position on the outsides of ramp 90 and with the smooth surfaces 95 and 96 in side-by-side position at the center of ramp 90. The ramp sections 91 and 92 can also be interchanged to place the smooth surfaces 95 and 96 in spaced positions on the outsides of ramp 90 to accommodate the skis of a snowmobile and rough surfaces 93 and 94 in side-by-side position at the center of ramp 90 for a traction surface to accommodate the drive track of a snowmobile.

The ramp sections 41, 42 and 91, 92 both for the preferred loading ramp 40 and the alternate loading ramp 90 are each defined by a pressed steel member of oblong shape. Referring now to FIGS. 9 to 11, the smooth surfaces 45, 46 and 95, 96 of ramp sections 41, 42 and 91, 92 respectively are formed by pressing transverse open slits 120 in the metal sheets leaving intervening bars 122 with smooth, rounded top surfaces 124 and with turned down edges 126. The rough surfaces 43, 44 and 93, 94 of ramp sections 41, 42 and 91, 92 respectively are formed similar to the smooth surfaces 45, 46 and 95, 96 as described above, except that the bars have holes 128 punched through from the bottom leaving burred edges 130 in the rounded top surface 124 of the bars 122 which form the rough traction surface. Any snow, mud or other foreign material carried onto the loading ramps 40, 90 by the snowmobile, garden tractor, or other vehicle being loaded will drop through the open slits 120 and holes 128 to maintain the ramps 40, 90 in a clean condition thereby effectively assuring smooth surfaces 45, 46 and 95, 96 and rough traction surfaces 43, 44 and 93, 94.

For the purpose of illustration and not limitation, the preferred embodiment of this invention for use in a standard wide model pickup box would include a transport platform with surface length and width dimensions sized to be slightly less than the inside length and width dimensions of the pickup box or approximately 96 inches long and 66 inches wide thereby allowing for easy insertion of the platform structure into the box without contacting or scratching the sides and ends of the box, yet allowing maximum utilization of the space within the box. The platform would be supported in an elevated horizontal position just high enough to leave a minimum of clearance of approximately 1 inch between the platform and wheel wells but no higher, thus maintaining the load as low as possible while utilizing a maximum amount of space within the box. The loading ramp would be approximately the same length as the platform but no longer, thereby establishing the maximum possible ramp length to minimize the angle of inclination in the loading position while being short enough to be stored completely under the platform so that the tailgate of the pickup can be completely closed when loading operations are not in progress. The narrow platform in the alternate embodiment is similarly sized to be easily inserted within the narrow model pickup box without contacting the sides of the box, the approximate dimensions of the platform being 96 inches long and 48 inches wide. The loading ramp for the alternate embodiment is also approximately the same length as the platform.

It can be appreciated that this invention can be utilized for loading and transporting many types of small vehicles and other cargo in addition to those mentioned above as well as many other uses which require utilization of the full width of a pickup box. In general, vehicles with drive tracks or drive wheels in the middle such as snowmobiles and motorcycles would best be loaded with the nonskid rough traction surfaces oriented to the middle of the ramp, and vehicles with spaced drive wheels such as garden tractors, dune buggies, go-carts and the like would best be loaded with the nonskid rough traction surface oriented to the outsides of the ramp.

Although the present invention has been described with a certain degree of particularity, it is understood that the present disclosure has been made by way of example and that changes in details of structure may be made without departing from the spirit thereof.

What is claimed is:

1. A loading apparatus adaptable for loading and unloading vehicles onto and from the bed of a pickup truck and the like comprising:
    a platform rigidly attached in spaced relation above the bed of a pickup truck, said platform including ramp section housing means mounted beneath said platform;
    loading ramp means including a pair of elongated rigid ramp sections adapted to be removably connected to said ramp section housing means for rearward and downward angular extension therefrom whereby to facilitate loading vehicles onto and from said platform, said loading ramp means including connector means interchangeably and removably connecting said loading ramp means to said ramp section housing means, each of said ramp sections being defined by a pressed steel member of oblong shape, the sides of each section having inwardly facing channels, the front end of each section having a shaft extending transversely at each end between said inwardly facing side channels and spaced under the front edge of said ramp section, and handles attached to and extending from the rear ends of each section; and
    said ramp section housing means including slidable support means for receiving and releasably holding said ramp sections in a storage position beneath said platform when not in use.

2. A loading apparatus according to claim 1, including means being adapted to support said platform above the wheel wells of a pickup truck to permit full utilization of the width and length of the pickup truck bed, and said slidable support means extending downwardly from said platform between said wheel wells.

3. A loading apparatus according to claim 2, said loading ramp means including ramp sections having a width when connected to said housing means of approximately one-half of said platform, said connector means operative to releasably interconnect said loading ramp sections at different spaced locations across the width of the rear end of said platform whereby vehicles may be successively loaded onto said platform in side-by-side relation to one another.

4. A loading apparatus according to claim 1, including vertical legs at each corner of said platform to support said platform in spaced relation above the bed of the pickup truck, and said slidable support means including a pair of glideways extending in side-by-side relation to one another the full length of said platform to receive said loading ramp sections.

5. A loading apparatus according to claim 4, each of said loading ramp sections being of a length when extended to correspond to the length of said platform.

6. A loading apparatus according to claim 4 wherein said vertical legs are of sufficient length to support the top surface of said platform at an elevated position above the wheel wells in the bed of the pickup truck but below the top edge of the sides of the pickup truck.

7. A loading apparatus according to claim 1, each of said ramp sections having at least two contiguous vehicle supporting panels of different surface friction characteristics extending in parallel relation between said front and rear ends thereof.

8. A loading apparatus according to claim 1, there being a pair of ramp sections each having a rough-surfaced half and a smooth-surfaced half extending longitudinally thereof, the smooth-surfaced half having a series of transverse open slits with intervening rounded top bars pressed into the surface of the ramp section, the rough-surfaced half including a plurality of openings provided with burred edges on the top surface thereof.

9. A loading apparatus according to claim 8, said ramp sections being interchangeable so that in one position the rough-surfaced halves are placed in side-by-side relation to form a nonskid, rough traction surface at the middle of said loading ramp means and the smooth-surfaced halves are placed in spaced relation at the outsides of said loading ramp means, and in an alternate position the smooth-surfaced halves are placed in side-by-side relation and the rough-surfaced halves are placed in spaced relation at the outsides of the said loading ramp means.

10. A loading apparatus according to claim 1, said connector means having transversely oriented shafts rigidly attached at each end to said loading ramp means under the front edges of said loading ramp means and a plurality of hook members with upwardly turned ends attached beneath said platform whereby when said loading ramp means is fully extended from the rear end of the platform to the ground in the inclined loading position the said shafts of said loading ramp means rest on said hook members and said upwardly turned ends engage said shaft to prevent said loading ramp means from moving rearwardly during loading operations.

11. A loading apparatus according to claim 10 wherein said front edges and said shafts of said loading ramp means are removable from the end of said platform thereby to facilitate alternate and interchangeable positioning of said loading ramp means for accommodating different types of vehicles and to facilitate shifting of said loading ramp means from side to side to load the right side, left side or middle of said platform.

12. A loading apparatus according to claim 1, said housing means having inwardly facing channel glideway means under and supporting the entire length of said platform, both ends of each channel being connected rigidly to said platform whereby the said loading ramp means are slidably received into and stored in the said channel glideways when said loading ramp means are not in use for loading operations.

13. A loading apparatus adaptable for loading and unloading vehicles onto and from the bed of a pickup truck and the like comprising:
a platform rigidly attached on the bed of a pickup truck, said platform including ramp section housing means mounted beneath said platform;
loading ramp means including a pair of elongated rigid ramp sections adapted to be removably connected to said ramp section housing means for rearward and downward angular extension therefrom whereby to facilitate loading vehicles onto and from said platform, said loading ramp means including connector means interchangeably and removably connecting said loading ramp means to said ramp section housing means, each of said ramp sections having a rough-surfaced half and a smooth-surfaced half, both of said halves extending longitudinally thereof, the smooth-surfaced half having a series of transverse open slits with intervening rounded-top bars pressed into the surface of the ramp section, the rough-surfaced half including a plurality of openings provided with burred edges on the top surface thereof; and
said ramp section housing means including slidable support means for receiving and releasably holding said ramp sections in a storage position beneath said platform when not in use.

14. A loading apparatus according to claim 13, including means adapted to support said platform between the wheel wells of a pickup truck, and said slidable support means extending downwardly from said platform between said wheel wells.

15. A loading apparatus according to claim 14, said loading ramp means including ramp sections having a width when connected to said housing means of approximately equal width of said platform, said connector means operative to releasably interconnect said loading ramp sections across the width of the rear end of said platform whereby a vehicle may be loaded onto said platform.

16. A loading apparatus according to claim 13, said ramp section housing means consisting of said slidable support means under the length of said platform to support said platform above the bed of the pickup truck, and said slidable support means including a pair of glideways extending in side-by-side relation to one another the full length of said platform to receive said loading ramp sections.

17. A loading apparatus according to claim 16, each of said loading ramp sections being of a length when extended to correspond to the length of said platform.

18. A loading apparatus according to claim 17, each of said ramp sections comprising a front subsection, a rear subsection, and hinge means for pivotally connecting said front subsection to said rear subsection, whereby in use position said front subsection being supported by the tailgate of the pickup truck extends horizontally rearwardly of said platform and said rear subsection extends angularly and downwardly from said hinge means to the ground, each of said ramp front subsections defined by a pressed steel member of oblong shape, the sides of each front subsection being defined by inwardly facing channels, the front end of each front subsection having a shaft transversely oriented and rigidly attached at each end between said inwardly facing side channels and in spaced relation under the front edge of said front subsection and each of said rear subsections defined by a pressed steel member of oblong shape, the sides of each rear subsection being defined by inwardly facing channels, and handles rigidly attached to and extending from the rear ends of each rear subsection.

19. A loading apparatus according to claim 13, said ramp sections being interchangeable so that in one position the rough-surfaced halves are placed in side-by-side relation to form a nonskid, rough traction surface at the middle of said loading ramp means and the smooth-surfaced halves are placed in spaced relation at the outsides of said loading ramp means, and in an alternate position the smooth-surfaced halves are placed in side-by-side relation and the rough-surfaced halves are placed in spaced relation at the outsides of said loading ramp means.

20. A loading apparatus according to claim 13, said connector means having transversely oriented shafts rigidly attached at each end to said loading ramp means in spaced relation under the front edges of said loading ramp means and a plurality of hooks with upwardly turned ends attached beneath said platform whereby when said loading ramp means is fully extended horizontally rearward from the rear end of the platform then angularly downward in the inclined loading position the said shafts of said loading ramp means rest on said hooks and said upwardly turned ends engage said shafts to prevent said loading ramp means from moving rearwardly during loading operations.

21. A loading apparatus according to claim 20 wherein said front edges and said shafts of said loading ramp means are removable from the end of said platform thereby to facilitate interchangeable positioning of said loading ramp means for accommodating different types of vehicles.

22. A loading apparatus according to claim 13, said housing means having inwardly facing channel glideway means under and supporting the entire length of said platform and rigidly attached thereto, whereby said loading ramp means are slidably received into and stored in the said channel glideways when said loading ramp means are not in use for loading operations.

* * * * *